(12) United States Patent
Dadia et al.

(10) Patent No.: US 10,078,843 B2
(45) Date of Patent: *Sep. 18, 2018

(54) SYSTEMS AND METHODS FOR ANALYZING CONSUMER SENTIMENT WITH SOCIAL PERSPECTIVE INSIGHT

(71) Applicant: Saama Technologies Inc., Campbell, CA (US)

(72) Inventors: Rajeev Dadia, Dublin, CA (US); Vidya Sagar Anisingaraju, San Jose, CA (US); Prashanth Talanki, San Jose, CA (US)

(73) Assignee: Saama Technologies, Inc., Campbell, CA (US)

(*) Notice: Subject to any disclaimer, the term of this patent is extended or adjusted under 35 U.S.C. 154(b) by 102 days.

This patent is subject to a terminal disclaimer.

(21) Appl. No.: 14/975,845

(22) Filed: Dec. 20, 2015

(65) Prior Publication Data

US 2016/0196564 A1 Jul. 7, 2016

Related U.S. Application Data

(63) Continuation-in-part of application No. 14/971,885, filed on Dec. 16, 2015, and a continuation-in-part of application No. 14/975,778, filed on Dec. 19, 2015.

(60) Provisional application No. 62/124,799, filed on Jan. 5, 2015, provisional application No. 62/125,169, filed on Jan. 15, 2015.

(51) Int. Cl.
*G06F 7/00* (2006.01)
*G06F 17/00* (2006.01)
*G06F 17/30* (2006.01)
*G06Q 30/02* (2012.01)

(52) U.S. Cl.
CPC ... *G06Q 30/0201* (2013.01); *G06F 17/30572* (2013.01); *G06F 17/30601* (2013.01)

(58) Field of Classification Search
CPC ......... G06F 17/30684; G06F 17/30997; G06F 17/30014; G06F 17/30572; G06F 17/30601; G06F 17/30864
See application file for complete search history.

(56) References Cited

U.S. PATENT DOCUMENTS

| 5,924,072 | A | 7/1999 | Havens | |
| 7,013,289 | B2 * | 3/2006 | Horn | G06Q 10/087 705/14.51 |
| 7,483,842 | B1 | 1/2009 | Fung et al. | |

(Continued)

*Primary Examiner* — Susan Chen
(74) *Attorney, Agent, or Firm* — Kang S. Lim

(57) ABSTRACT

The present invention relates to systems and methods for cloud based consumer sentiment analysis with social insights. Data is integrated from a plurality of data sources, including a structured data source, an unstructured data source, a social data source, and a syndicated data source. Key attributes are selected from the integrated data, and may be name value pair requests. From these key attributes, consumer segments, sentiments and attribute correlations may be generated. The segments are generated from the social data. The correlation is generated using clustering algorithms. In some embodiments, generating sentiment and generating correlations dynamically utilizes models according to attributes of the integrated data. Polarity, emotion and topicality may be calculated for the generation of visualizations.

22 Claims, 14 Drawing Sheets

(56) References Cited

U.S. PATENT DOCUMENTS

| | | | |
|---|---|---|---|
| 9,348,815 B1* | 5/2016 | Estes | G06F 17/2785 |
| 2003/0004790 A1 | 1/2003 | Calderaro et al. | |
| 2005/0132233 A1* | 6/2005 | James | G06F 21/10 |
| | | | 726/4 |
| 2006/0069589 A1* | 3/2006 | Nigam | G06F 17/274 |
| | | | 706/55 |
| 2006/0212486 A1 | 9/2006 | Kennis et al. | |
| 2009/0187471 A1 | 7/2009 | Beaton et al. | |
| 2009/0282019 A1* | 11/2009 | Galitsky | G06F 17/30634 |
| 2009/0287642 A1 | 11/2009 | Poteet et al. | |
| 2010/0205541 A1* | 8/2010 | Rapaport | G06Q 10/10 |
| | | | 715/753 |
| 2010/0251876 A1* | 10/2010 | Wilder | G10H 1/0008 |
| | | | 84/609 |
| 2012/0102053 A1* | 4/2012 | Barrett | G06F 17/30592 |
| | | | 707/754 |
| 2012/0221486 A1 | 8/2012 | Leidner et al. | |
| 2012/0296845 A1 | 11/2012 | Andrews et al. | |
| 2013/0080184 A1* | 3/2013 | Streat | G06Q 50/24 |
| | | | 705/2 |
| 2013/0173612 A1* | 7/2013 | Shah | G06F 17/3053 |
| | | | 707/731 |
| 2013/0297543 A1 | 11/2013 | Treiser | |
| 2014/0100922 A1 | 4/2014 | Aycock | |
| 2014/0207525 A1* | 7/2014 | Dandekar | G06Q 30/0206 |
| | | | 705/7.35 |
| 2014/0222721 A1* | 8/2014 | Stock | G06N 99/005 |
| | | | 706/11 |
| 2015/0310508 A1 | 10/2015 | Pattekar et al. | |
| 2016/0105423 A1* | 4/2016 | Logue | H04L 9/3268 |
| | | | 726/10 |

* cited by examiner

SYSTEMS AND METHODS FOR ANALYZING CONSUMER SENTIMENT WITH SOCIAL PERSPECTIVE INSIGHT

CROSS REFERENCE TO RELATED APPLICATIONS

The present application claims priority under 35 USC 119(e) to a commonly-owned provisional application entitled "Saama Fluid Analytics Engine (SFAE)", Application No. 62/124,799, filed on Jan. 5, 2015, and also to a commonly-owned provisional application entitled "Cloud Based Consumer Sentiment with Social Perspective Insight (CSSPI)", Application No. 62/125,169, filed on Jan. 15, 2015, both of which are incorporated herein by reference for all purposes.

The present application also is a continuation-in-part and claims priority to a commonly-owned application entitled "Abstractly Implemented Data Analysis Systems and Methods Therefor", application Ser. No. 14/971,885, filed on Dec. 16, 2015, which is incorporated herein by reference for all purposes.

Additionally, the present application is a continuation-in-part and claims priority to a commonly-owned application entitled "Data Analysis Using Natural Language Processing to Obtain Insights Relevant to an Organization", application Ser. No. 14/975,778, filed on Dec. 19, 2015, which is incorporated herein by reference for all purposes.

BACKGROUND

The present invention relates to systems and methods for generating, analyzing and visualizing consumer sentiments with social insights and by consumer segments. Such systems and methods enable businesses to more efficiently drive business strategies that are responsive to consumer emotions and sentiments, in order to increase one or more business objectives.

Businesses are increasingly competitive as information access becomes more widespread. In order to remain viable, businesses must rely upon advancements in marketing, price optimization, and understanding a consumer's reaction to a product or business activity. Typically, data poor mechanisms were employed in order to collect information on consumers' sentiments. These methodologies included surveys, focus groups, and other targeted research. However, there is a major drawback with these techniques due to the generally low sample size, lack of candidness on behalf of those being surveyed, and inaccurate reflection of the consumer base in the surveyed group.

As social media and other online platforms have become more prominent features in everyday lives, more and more businesses have dedicated resources in order to understand and market using these new channels into potential customers. Moreover, in addition to being a useful vehicle for delivering a message to consumers, these platforms provide unique insights into consumer sentiments.

In addition to social networks, we live in an age where vast amounts of data are being collected. These various data sources, in conjunction with newly available social network data, allows for unprecedented abilities to analyze consumer sentiment. However, analyzing this vast data pool is fraught with logistic and technical difficulties. Too often, superfluous information obscures the insights that can be gained from the data. Misdirection and false conclusions are common; thus, businesses are cautious to rely too heavily upon such "big data" analytics.

There are existing software applications for performing data analytics-based business intelligence currently. These applications permit the acquisition of data, the organization of stored data, the application of business rules to perform the analytics, and the presentation of the analytics result. In the past, such applications require the use of an expert system integrator company or highly skilled personnel in the IT department (often a luxury that only the largest companies can afford) since these tools require custom coding, custom configuration and heavy customization.

Furthermore, new technologies are now available for data storage, data acquisition, data analysis, and presentation. Big data or cloud computing (whether open-source or proprietary) are some examples of such technologies. Some of these technologies have not yet been widely adopted by the business intelligence industry. Being new, the level of expertise required to make use of these technologies is fairly high since there are fewer people familiar with these technologies. This trend drives up the cost of implementing new business intelligence systems or updating existing business intelligence systems, particularly if the business desire to make use of the new technologies.

It is therefore apparent that an urgent need exists for systems and methods generating, analyzing and visualizing consumer sentiments with social insights and by consumer segments. Such systems and methods enable businesses to more efficiently drive business strategies that are responsive to consumer emotions and sentiments, in order to increase one or more business objectives.

SUMMARY

To achieve the foregoing and in accordance with the present invention, systems and methods for cloud based consumer sentiment analysis with social insights are provided. Such systems allow businesses to more accurately ascertain the feelings and emotions of a relevant consumer segment in order to drive a business objective.

In some embodiments, the systems and methods integrate data from a plurality of data sources. The integration may employ cloud-based computing techniques. The plurality of data sources includes a structured data source, an unstructured data source, a social data source, and a syndicated data source.

Next, key attributes are selected from the integrated data. The key attributes may be name value pair requests. From these key attributes, consumer segments, sentiments and attribute correlations may be generated. The segments are generated from the social data. The correlation is generated using clustering algorithms. In some embodiments, generating sentiment and generating correlations dynamically utilizes models according to attributes of the integrated data.

Polarity, emotion and topicality for a target and an audience may be calculated. The audience may be one of the generated segments, in some embodiments. The polarity, emotion and topicality may be utilized to generate a visualization of the correlations.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
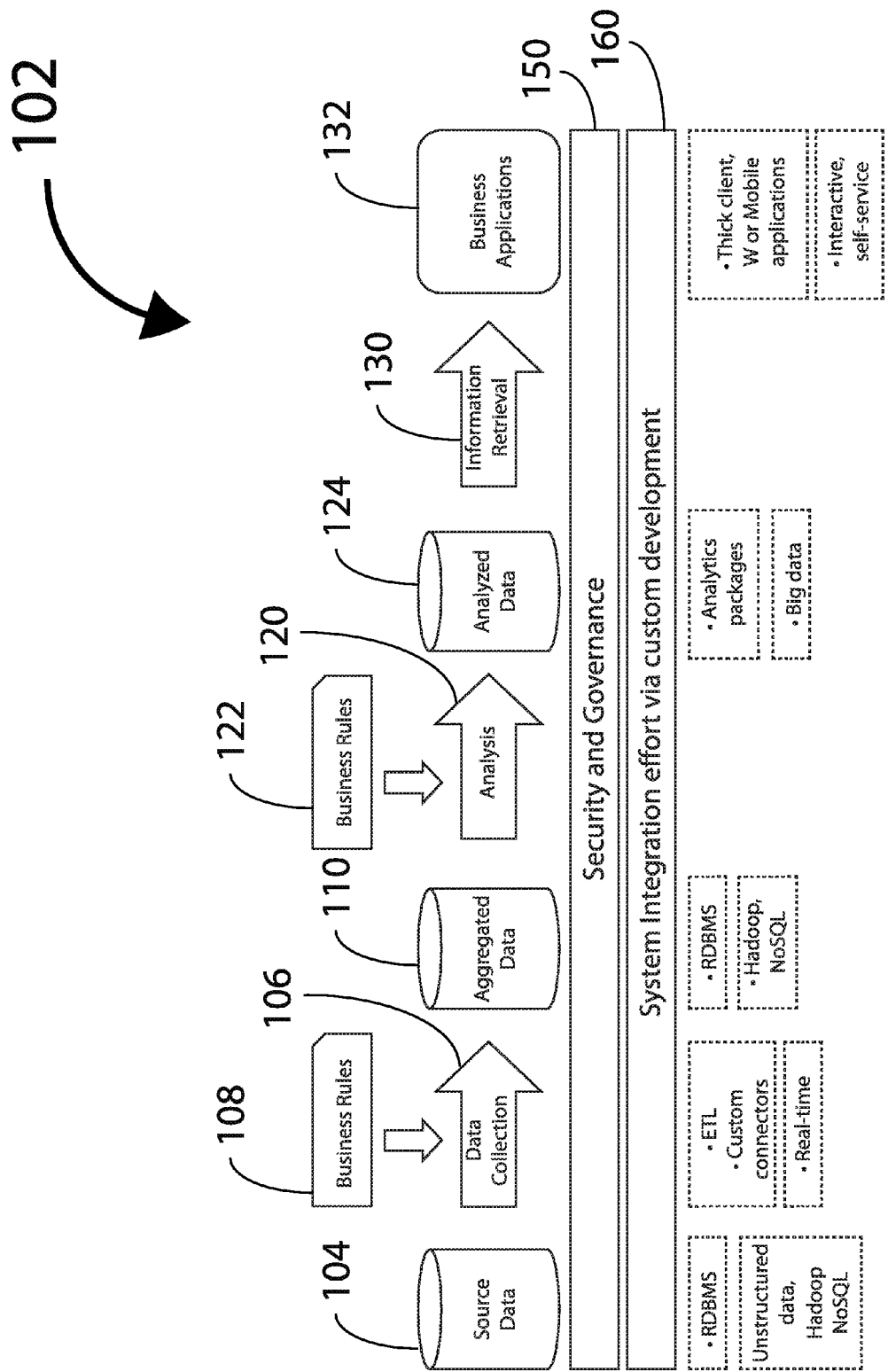
FIG. 1 shows, in accordance with an embodiment of the invention, a typical existing business intelligence (BI) analytics system.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The presently disclosed systems and methods are directed toward business intelligence when a vast wealth of data is available. As previously noted, this area of "big data" is relatively new, and subject to misinterpretation or unwieldy analysis. The present systems and methods overcome these hurdles by introducing social insights and customer segmentation in order to deliver more accurate and impactful customer insight analysis.

Also note that the present disclosure applies to any situation where group sentiment analysis is desired. It should be readily understood that while business insights are of particular importance to the presently disclosed systems and methods, the embodiments herein may be employed within basic research institutions, by political campaigns, for governmental messaging, and the like. Thus, while particular focus is places on utilizing the disclosed systems and methods for the generation of business insights, it should be readily understood that the scope of this disclosure extends to any purpose of sentiment analysis.

Lastly, note that the following description will be provided in a series of subsections for clarification purposes. These following subsections are not intended to artificially limit the scope of the disclosure, and as such any portion of one section should be understood to apply, if desired, to another section.

I. Abstractly-Implemented Data Analysis System

Embodiments of the invention relate to methods and apparatuses for creating data analysis systems for generating insights (also known as results) from a plurality of data sources without requiring the designer/implementer of the data analysis system or the user to understand complicated technology details such as for example coding, big data technology or high-end business analytics algorithms. These and other advantages of embodiments of the present invention will be better understood with reference to the figures and discussions that follow.

In one or more embodiments, there exists an abstraction layer, known as a metadata layer, which contains metadata construct pertaining to data definition and design definition for subcomponents of the DA system. The technology details (e.g., what technology is employed to implement a particular subcomponent or to facilitate communication/storage) is abstracted and hidden from the designer/implementer and/or the user. The subcomponents communicate via APIs (application programming interface) to facilitate plug-and-play extensibility and replacement.

The metadata construct (which may be a file or library or collection of files/libraries) contains information on the data definition (what data to expect; the format of the data; etc.) as well as the design definition (what to do with the receive data; how to store, organize, analyze, and/or output the data, etc.) as well as the data flow among the subcomponents. Preferably, the metadata construct is created in advance during design time. At execution time, the execution engine receives the BI query from a user, reads the data in a metadata construct that corresponds to that BI query and executes the BI query using data in the metadata construct to enable the subcomponents to retrieve and analyze data as well as output the BI insight.

In one or more embodiments, a user interface, which may be graphical, is employed to create the metadata construct. In one or more embodiments, the metadata construct is an XML, file. The metadata construct represents a standardized manner to communicate with subcomponents of the BI system and contains instructions on how those subcomponents are to act, alone and in coordination with one another, to transform the data from the various data sources into an analysis result such as a business insight. Since the metadata construct is an abstraction of the underlying technology, embodiments of the invention allow implementers to create an end-to-end BI application that takes in a BI query and automatically provide the BI insight simply by populating or creating content in the appropriate metadata construct (as well as some light customization for data output format if desired).

In this manner, an end-to-end DA application (such as a business intelligence application) can be implemented without requiring the time consuming hard coding and expensive/scarce knowledge regarding the underlying technologies/algorithms. Furthermore, by allowing subcomponents to be implemented in a plug-and-play manner via APIs, it is possible to re-use or leverage existing analytics tools or parts thereof (such as an existing analysis module) by simply providing an appropriate API for the module and generating the data definition and design definition for it in the metadata construct. This is a huge advantage to customers who may have already invested substantially in existing data analysis infrastructure.

These and other advantages of embodiments of the present invention will be better understood with reference to the figures and discussions that follow.

FIG. 1 shows, in accordance with an embodiment of the invention, a typical existing business intelligence (BI) analytics system. In this application, a business intelligence system is used as an example of a data analytics system but it should not be a limitation and the discussion applies to data analytics systems in general.

A BI system 102 receives data from a variety of data sources 104 in a variety of formats. These data sources may include the corporate transactional systems (such as sales or accounting or customer relations), syndicated data (such as from 3rd party), web-based data (such as social media) and streaming data. The data may be stored in a relational database (RDBM) or in big data-related storage facilities (e.g., Hadoop, NoSQL). With regard to format, the data may be in any format including unstructured, structured, streaming, etc.

Data collection 106 pertains to activities required to acquire the data from the data sources 104. Data acquisition may employ ETL (Extract, Transform, Load) technologies or may employ custom connectors to the individual data sources 102 for example. The data collection may happen in batches or in real time.

During data collection, business rules 108 may apply to pre-filter and/or pre-process the data. For example, some syndicated data may be in a specific format to suit the needs of a particular system unrelated to BI (such as reimbursement data from the reimbursement database of insurance companies, which data may include short-hand alphanumeric coding for common procedures and/or medication) and these formats may need to be converted for more efficient utilization by the analysis component later.

The data collected is then stored in an aggregated data source 110 for ready use by the analysis module. The aggregated data may be stored in a relational database (RDBM) or in big data-related storage facilities (e.g., Hadoop, NoSQL), with its formatting pre-processed to some degree (if desired) to conform to the data format requirement of the analysis component.

The analysis component analyzes (120) the data using business rules 122 and stores the BI insight in analyzed data store 124. The analysis may employ some custom analytics packages or may employ big data analysis techniques for example. At some point in time, the user may desire to know the BI insight and thus information retrieval (130) is performed to obtain the BI insight from the analyzed data store 124 and to present the BI insight to business applications 132. These presentation methods may be self-service or interactive (such as through a webpage that allows the user to sort and organize the data in various ways). The presentation medium may be a thick client, a web or mobile application running on a desktop, laptop, or mobile device for example.

Underlying the above activities is a security and governance subsystem 150 that handles house-keeping and system-related tasks such as scheduling jobs, data access authorization, user access authorization, auditing, logging, etc.

In the past, the implementation of BI system 102 typically involves hard-coding the components, creating custom code to enable the components of FIG. 1 to interoperate and produce the desired BI insight. The system integration effort and custom development (160) require a substantial investment of time and effort during the development, integration, and deployment stages. Because of the rapidly changing technology landscape, a typical company often does not have sufficient IT expertise in-house to build, maintain and/or deploy a BI system if that company desires to utilize the latest technology. Instead, the work is contracted out to integrator firms with special expertise at great cost in each of the development, maintenance, deployment, and upgrade phases.

The hard coding approach makes it difficult and/or expensive to upgrade when new BI insight needs arise and/or when improved technology is available for the tasks of data acquisition, data analysis, and/or data presentation. It also makes it difficult to re-use legacy subcomponents that the business may have already invested in in the past. This is mainly because of both the cost/time delay involved in re-coding a BI system and the predictable scarcity of knowledgeable experts when new technologies first arrive.

Figure 2:
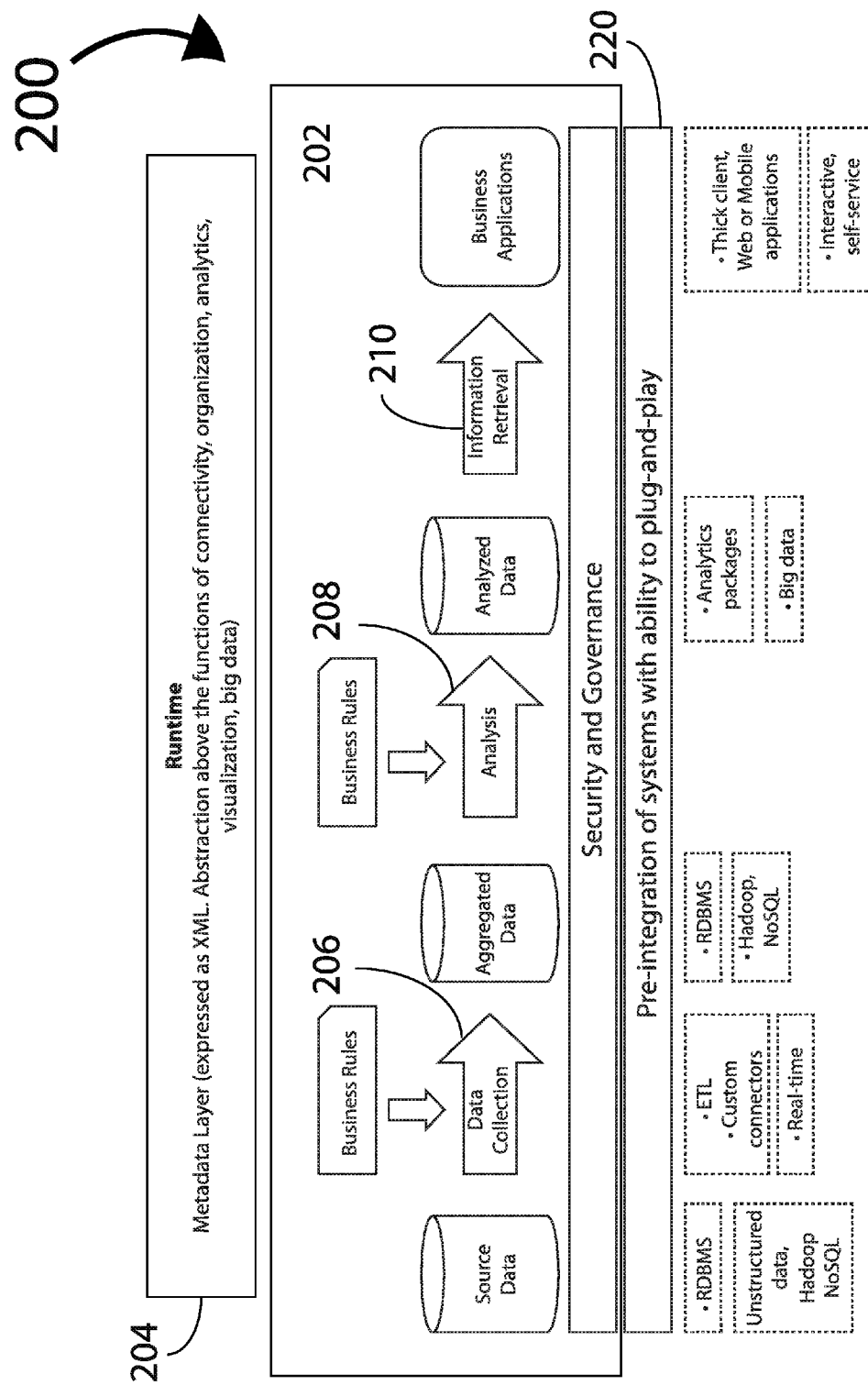
FIG. 2 shows, in accordance with an embodiment of the invention, the conceptual organization of the improved abstractly-implemented data analysis system (AI-DAS)

FIG. 2 shows, in accordance with an embodiment of the invention, the conceptual organization of the improved abstractly-implemented data analysis system (AI-DAS). The conceptual tasks that need to be performed in box 202 are analogous to those discussed in connection with FIG. 1. However, embodiments of the invention pre-integrate (220) the subcomponents (to be discussed later in FIG. 3 and later figures) with plug-and-play capability in order to facilitate their upgradability and extensibility.

More importantly, there exists an abstraction layer, known as a metadata layer 204. The metadata may be implemented by a file or library or a collection of files or libraries and contains data pertaining to the data flow among the subcomponents of components implementing the three tasks of BI system 200 (data collection 206, data analysis 208, and analysis result retrieval/presentation 210). The metadata may also include information about data definition and design definition for each of the subcomponents. Generally speaking, data definition pertains to the location where the data comes from and where it is to be outputted, the format of the data, and the like. Design definition generally pertains to the operation in each subcomponent including for example what to do with the inputted data, how to store, organize, analyze, output the data, etc.

The metadata 204 is designed during design time in order to define the operation of the subcomponents and the data flow among the subcomponents, and by extension, the operation of the resulting BI system for a particular type of query. During design time, the designer/implementer is shielded or isolated from the technology details of the subcomponents. The designer/implementer task becomes one of populating the metadata construct with sufficient information to allow each subcomponent to know what data to expect and to output, and how each subcomponent is to behave during execution. In an embodiment, a graphical user interface is provided to assist in the task of filling out the data fields of the metadata. Because the implementer/designer of the BI system only needs to work at the high level of abstraction of the metadata layer, expensive skilled knowledge regarding the newest technology is not required. Further, because the system can be easily reconfigured (simply by creating another metadata) to handle different analysis tasks or accommodate different/substitute subcomponents, re-use of many of the subcomponents is promoted.

At execution time, the business intelligence query from the user is intercepted and a metadata construct (file, library, or set of files/libraries) appropriate to that business intelligence query is retrieved. The execution engine then reads and interprets the data in the metadata in order to know how to utilize the subcomponents to perform tasks to arrive at the business intelligence insight requested by the business intelligence query. Again, the user does not need know the details of the underlying technologies or even the presence/structure of the metadata itself. As long as the user can input a business intelligence query that can be parsed and understood by the business intelligence system, the business intelligence system will automatically select the appropriate metadata construct and will automatically carry out the required tasks using data from the metadata construct and the subcomponents of the business intelligence system.

Figure 3:
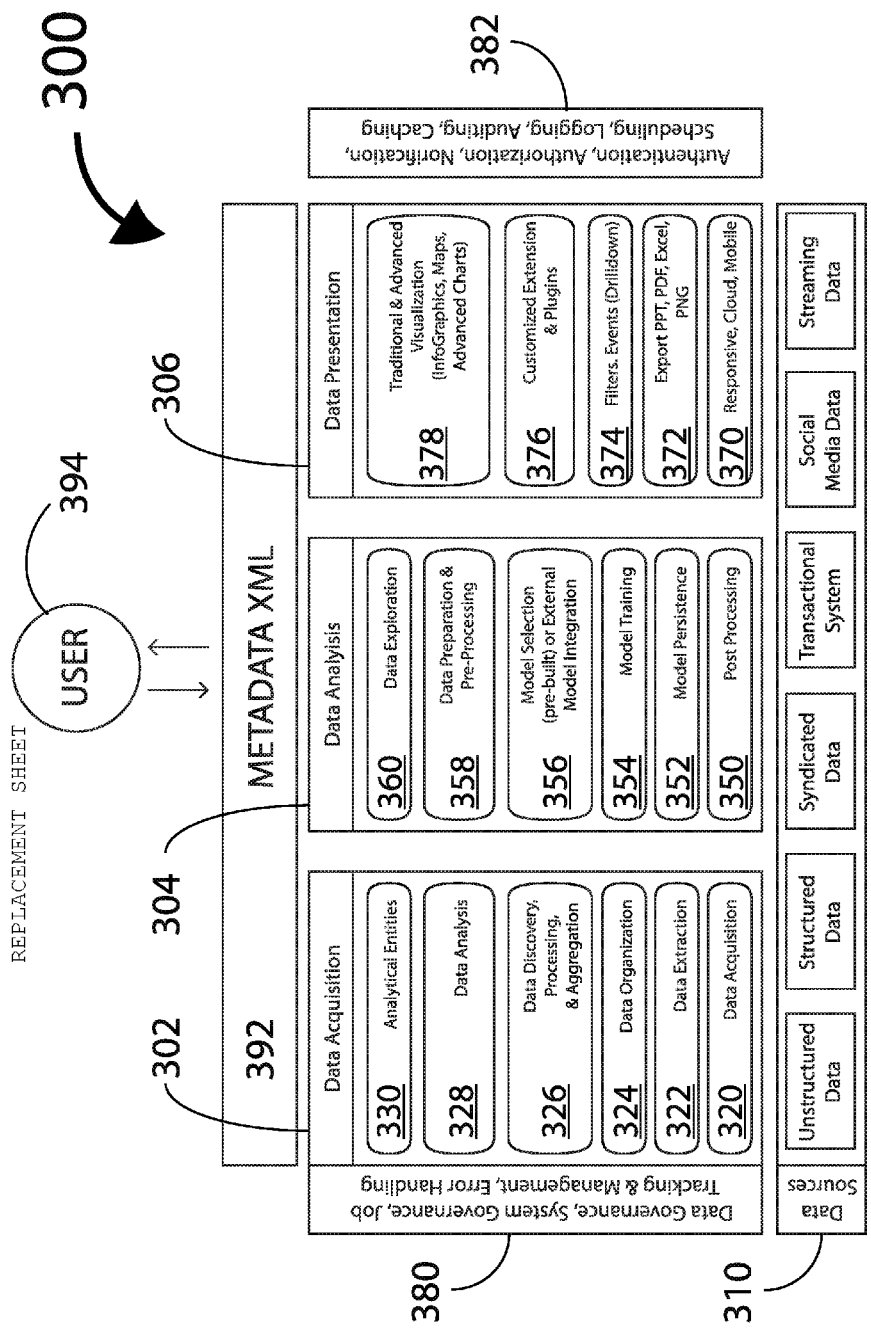
FIG. 3 shows, in accordance with an embodiment of the present invention, the details of one implementation of the abstractly-implemented data analysis system (AI-DAS) system.

FIG. 3 shows, in accordance with an embodiment of the present invention, the details of one implementation of the abstractly-implemented data analysis system (AI-DAS) system 300. AI-DAS 300 includes three main components: Data acquisition, data analysis, and data presentation.

Data acquisition 302 relates to getting the data, organizing the data, extracting the data, storing the data. As shown in box 310, the various data sources include unstructured data (e.g., freeform data such as the text entered by patient comments or doctor/nurse comments), structured data such as data enter into fields of a form, syndicated data such as data purchased or received from third parties, transactional system data such as data directly obtained from the ERP system or the enterprise data store of the company, social media data such as data from Facebook, Twitter, Instagram, and the like. The data may be received in batches or may be streaming data. These are only examples of data sources that may be employed for analysis by the AI-DAS 300.

Within data acquisition component 302, there exist a plurality of subcomponents shown as data acquisition-related subcomponents 320-330. Subcomponent 320 pertains to the task of data acquisition, which relates to how the data is acquired from various sources 310. Subcomponent 322 relates to data extraction, which contains the logic to extract the data sources 310. Subcomponent 324 pertains to data organization, which contains the logic to organize the extracted data. Subcomponent 326 pertains to certain pre-processing of the data. For example, the extracted data is discovered (such as using parsing or artificial intelligence) processed (such as mapping) and aggregated. Splitting and merging of various data items may also be done.

Subcomponent 328 pertain to additional higher level processing of the data, if desired. Subcomponent 330 pertains to grouping data sources into a transactional unit that can be processed as a single entity. For example, the total number of data sources may comprise hundreds of data sources available. However, for a particular business intelligence query, only certain data resources are used. These can be grouped together in a single analytical entity for ease of administration.

Data analysis component 304 relates to analyzing the data and extracting meaning from the aggregated data that is output by data acquisition component 302. Within data analysis component 304, there exists a plurality of subcomponents shown as data analysis-related subcomponents 350-360. Subcomponent 360 relates to data exploration since at this stage, it may not be known what the data contains. Artificial intelligence or pattern matching or keywords may be employed to look for meaning in the data. The data can be prepared and preprocessed in 358 to convert the data into a format for use by the algorithm.

The three subcomponents 352, 354, and 356 represent the machine learning approach that is employed for this example of FIG. 3. In subcomponent 356, the model is selected which may be prebuilt or an external model may be integrated. In subcomponent 354, the model is trained and once the model is selected 356 and trained in 354, the model may be persisted 352 to process the incoming data. Post-processing 350 relates to preparing the data for presentation, which occurs in data presentation component 306.

Data presentation subcomponent 306 relates to how to present the data to the user. The data may be presented using traditional and advanced visualization methods (378) such as infographics, maps, and advanced charts. Legacy presentation tools may also be employed via standard or customized extensions and plug-ins 376. Tool may be provided for the user to filter and to drill down the data, essentially allowing the user to explore the result in 374. The data may also be exported into a desired data format for later use. This is shown 372 wherein the example the formats are Power-Point, PDF, Excel, PNG. The presentation mechanism can be interactive or static, and presentation data can be sent via the cloud and/or internal network to a laptop, desktop, or mobile device (370).

Subcomponent 380 relates to data governance, system governance, job tracking and management, and error handling. These are tasks related to managing the hardware and software resources to perform the analysis. Subcomponent 382 relates to control of data access and job execution and user access. Thus, there is shown authentication, authorization, notification, scheduling of jobs. Logging, auditing, and intelligent caching of data to improve execution speed are also shown in 382.

A metadata construct 392 is shown interposing between the user 394 and the components/subcomponents of the AI-DAS 300. As mentioned, this metadata contains the higher level abstraction of the subcomponents and allow the AI-DAS to be implemented without knowing the complex underlying technology details.

All the subcomponents shown in each of the data acquisition, data analysis, and data presentation components can be either off-the-shelf, custom created, open-source, or legacy subcomponents. For plug-and-play implementation, these subcomponents preferably communicate using the API model. These subcomponents can be implemented on an internal network, in the cloud using a cloud-based computing paradigm (such as through Amazon Web Services or Google Web), or a mixture thereof. Generically speaking, these are referred to herein as computer resource.

Figure 4:
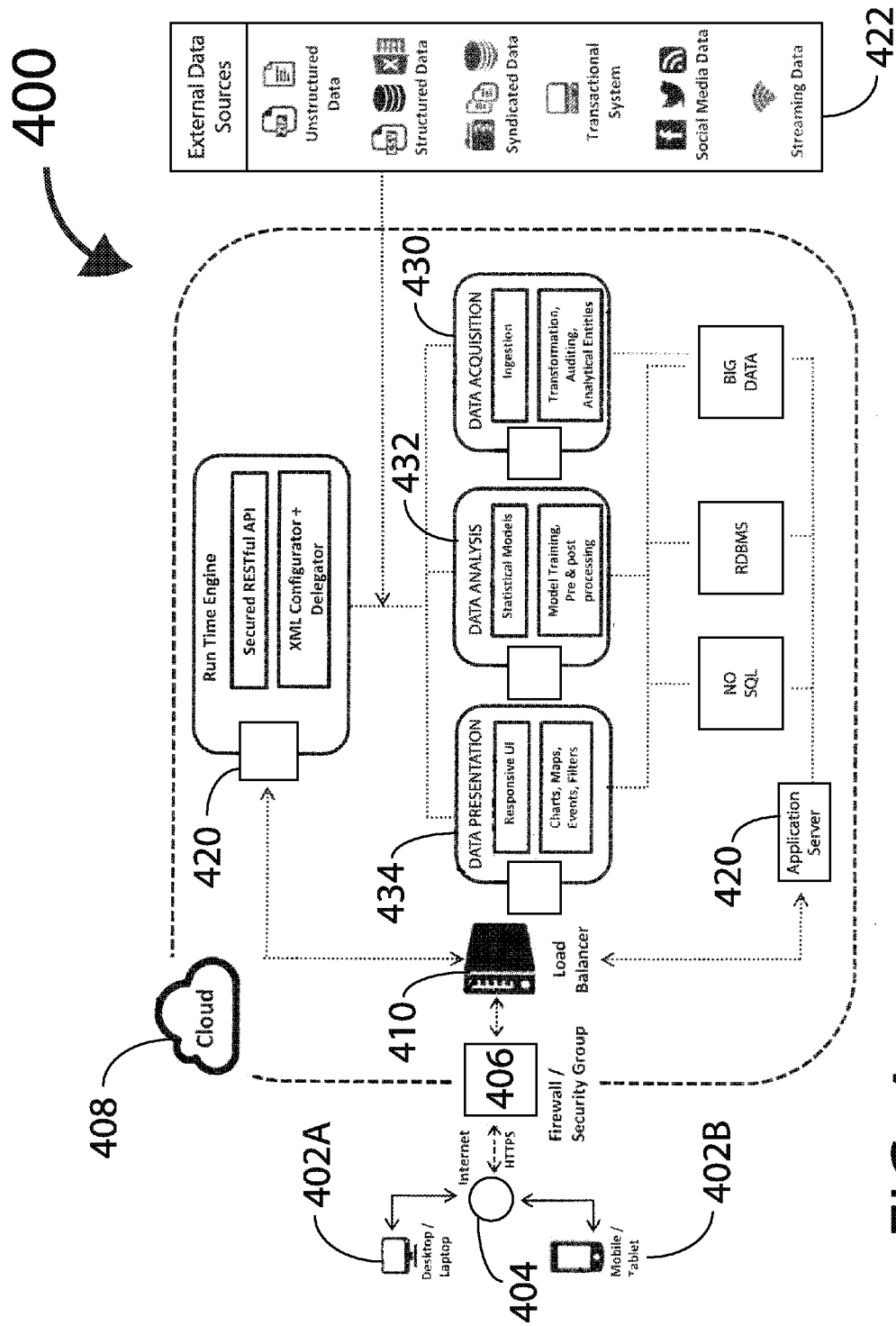
FIG. 4 shows a system architecture of an example AI-DAS implementation.

FIG. 4 shows a system architecture of an example AI-DAS implementation, including user interface devices 402A and 402B (desktop/laptop and mobile devices respectively). These devices can access the AI-DAS system 400 via in the Internet 404 using for example the HTTPS protocol. Firewall/security group 406 and cloud 408 show that components/subcomponents and data storage employed to implement the AI-DAS may reside in the cloud or may reside behind the firewall within a company or can be both.

The AI-DAS operation is governed by a load balancer 410 which load balances multiple copies of the AI-DAS runtime engine 420. For ease of illustration, the multiple implementations of the AI-DAS runtime engine 420 are shown at both the top and the bottom of FIG. 4. At the top of FIG. 4, these multiple instantiations of the AI-DAS runtime engine interacts with the API (such as Secure RESTful API) that governs the communication between subcomponents in the data acquisition component, the data analysis component, and the data presentation component. The AI-DAS runtime engine also reads the metadata (implemented as an XML in the example) and interpret the XML then delegates the tasks specified by the XML to various subcomponents in the data acquisition, data analysis, and data presentation subcomponents.

Data is received from external data sources 422 and is processed via data acquisition subcomponent 430, data analysis subcomponent 432, and data presentation subcomponent 434. The data is processed by data acquisition subcomponent 422 via ingestion module and transformation, auditing, analytical entities. The aggregated and analyzed data is then stored in the appropriate data store (such as Hadoop big data store), relational database RDBMS, or noSQL data store.

The data analysis subcomponent 432 represents the intelligence component and includes therein statistical models and modules related to model training, pre- and post-processing. The data presentation subcomponent 434 includes the various responsive (interactive) user interfaces and may include traditional presentation tools such as charts, maps, events, filters. As shown in FIG. 4, there may be multiple instantiations of each of the components/subcomponents in addition to different instantiations of multiple runtime engines, all of which can be load balanced to horizontally scale the analytics system to accommodate any volume of analytics jobs.

Generally speaking, there are the two separate phases of building and delivering an AI-DAS end-to-end application. One of the requirements is that the subcomponents employ APIs, allowing them to interoperate using an API model and to receive instructions from the execution engine as the execution engine interprets the metadata. Thus, during design time, a designer/implementer may create the metadata XML that includes the data definition and design definition for the subcomponents. Once the design phase is completed, the system is deployed and ready to produce analysis result during execution time.

During execution time (which occurs when a user inputs a query), the metadata XML is selected for the query, interpreted and executed by the AI-DAS engine, which metadata specifies how each subcomponent would behave based on the parameters specified in the metadata. The metadata also specifies the format of the data that the subcomponents exchange among each another, as well as the overall data flow from data intake from multiple data sources to the presentation of the analytic results to the user interface devices.

Figure 5:
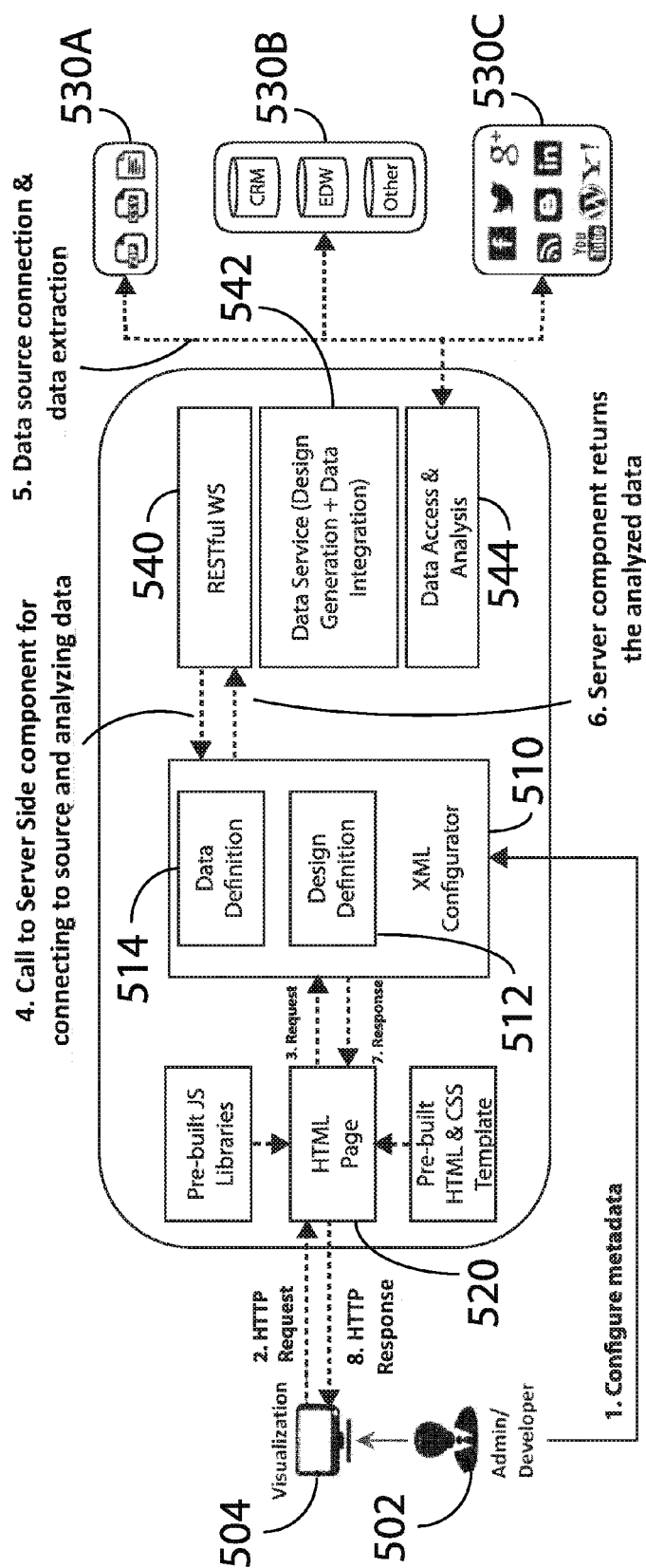
FIG. 5 shows, in accordance with an embodiment of the invention, an example workflow employing the runtime engine in order to perform business intelligence analysis.

FIG. 5 shows, in accordance with an embodiment of the invention, an example workflow employing the runtime engine in order to perform business intelligence analysis. During design time, administrative/developer 502 employs UI device (which may be for example a laptop or desktop computer) 504 to configure the metadata (such as the XML). This is shown as step 1 of FIG. 5. Preferably, a graphical user interface is employed to simplify the task of populating the metadata fields. At this time, any custom HTML templates and custom javascript can also be created to format the output if desired.

With respect to the metadata XML, the admin/developer 502 may define the data. That is the admin/developer may specify where the data comes from and the type of data that is inputted (e.g., free-form, stream, structured, and the like). The admin/developer 502 may also specify the design definition, that is how the data is used in the application. The design definition defines the goal of the data analysis. For example, one goal may be to perform sentiment analysis on conversation data about nurses. Another goal may be to discover the top three hot topics in the unstructured data that is received. Another goal may be to import certain columns in a relational database and run it through a certain model to identify patients who are not satisfied.

The design definition can also specify the manner in which data is outputted. Examples of such specification include the format and the devices and/or data presentation technologies involved. These are shown in 510, 512, and 514 of FIG. 5.

Then during execution time the user may use a UI device to issue a HTTP request (step 2) that is received by the HTML page 520. The HTML page 520 parses the request then issues another request (step 3) to acquire the appropriate associated metadata XML that contains the data definition and the design definition relevant to the instant query.

With this data definition and design definition in the XML, the AI-DAS engine then makes a call to the server-side component for connecting to resources to obtain data and to analyze data. Note that these data sources and the manner in which the data is analyzed are specified by the XML in the data definition and design definition 514 and 512. This is step 4.

In step 5, the data source connections are selected to connect to the appropriate data sources 530A, 530B, and 530C to obtain data for analysis. The analysis is performed by the server subcomponent that employs, in the example of FIG. 5, the RESTful web service 540. Analysis includes performing data service (design generation and data integration) as well as data access and analysis (542 and 544) in accordance with the definition in the XML.

Once data analysis is completed by the AI-DAS server, the server component returns the analyzed data (step 6) and the response (step 7) is provided to the HTML page. The response may be formatted in accordance with the definition in the XML page. The response is then returned to the UI device 504 for viewing by the user and for interaction by the user (step 8)

Figure 6:
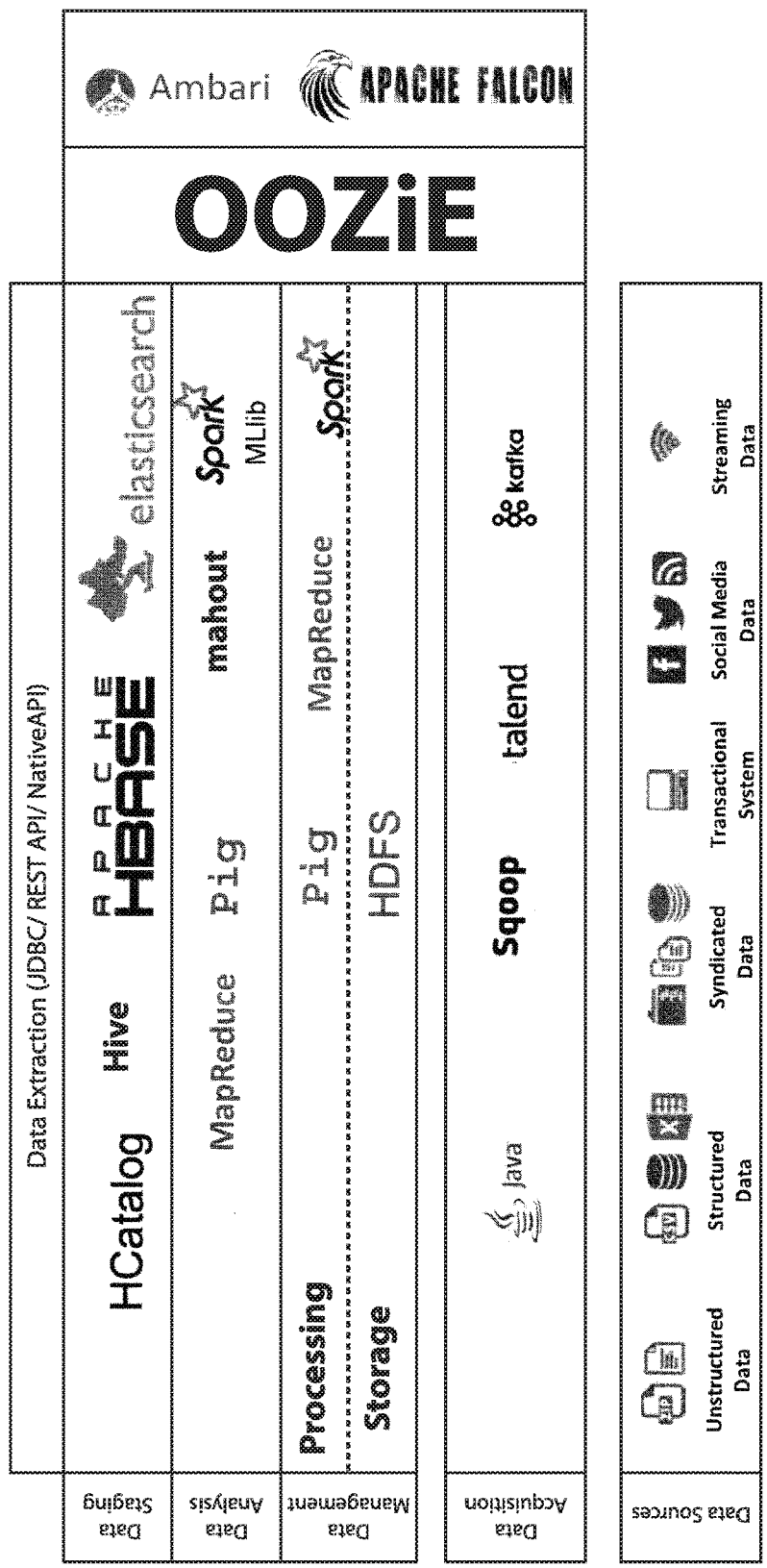
FIG. 6 shows some of the technologies involved in implementing the data sourcing, data acquisition, data management, data analysis, data staging, and data extraction.

FIG. 6 shows some of the technologies involved in implementing the data sourcing, data acquisition, data management, data analysis, data staging, and data extraction.

Some of these technologies are well-known in distributed computing/big data for storage (such as Hadoop) and for analysis (such as MapReduce, Spark, Mahout). Workflow engine may be provided by OOZIE while system administration may be provided by Ambari and Apache Falcon.

It should be noted that the technology details of FIG. 6 are hidden from the design/implementer during design time since the designer/implementer needs only be concerned with the metadata population and any optional HTML/JS customization for data outputting. These technology details are also hidden from the customer/user during execution since the customer/user only needs to issue a query that can be parsed to obtain the associated XML, and the rest of the analysis and underlying details regarding technology are handled transparently.

Figure 7:
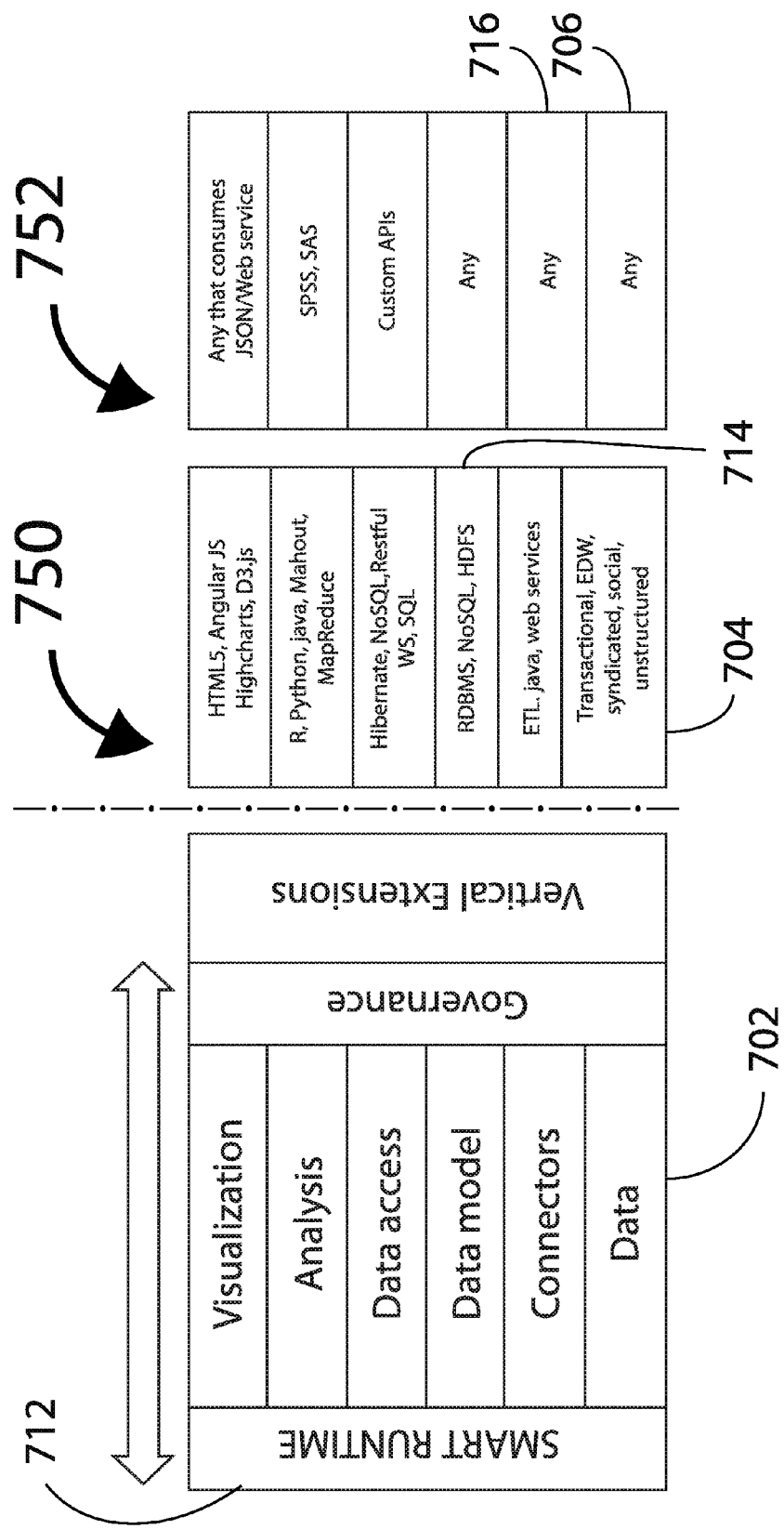
FIG. 7 shows some of the technologies employed in implementing each of the technology stacks in the AI-DAS system.

FIG. 7 shows some of the technologies employed in implementing each of the technology stacks in the AI-DAS system. For example, the data layer 702 may be implemented by (704) transactional, enterprise data warehouse (EDW), syndicated, social, and unstructured data. However, any other alternative data source (706) may be employed.

Connectors layer (712) may be implemented by (714) ETL, Java, Web services. However, any appropriate alternative integration connecting technology (716) may also be employed. The same applies to the data model layer 722, data access layer 724, analysis layer 726, and visualization layer 728. For each of these layers, there is a corresponding list of example technologies in the stack 750 as well as in alternatives/integration 752. One important point to note is since the underlying technology is hidden, the layers (such as data, connectors, data model, data access, and the analysis, visualization) may be implemented by any appropriate technology, including legacy technology.

As can be appreciated from the foregoing, embodiments of the invention renders it unnecessary for the designer/implementer to know or to manipulate complex technology in the implementation, maintenance, or upgrade of a data analysis system. The metadata layer abstracts these complex technology details away and provide standardized, easy-to-implement way of specifying how the DAS system should operate to solve any particular analysis problem.

As long as the subcomponents comply with the API model for interoperability, the underlying technology may be interchangeable on a plug-and-play basis. The ease with which the AI-DAS system can be implemented (due to the abstraction of the complex technology details away from the designer/implementer) encourages exploration and renders implementation, maintenance, and upgrade of a data analysis system substantially simpler, faster, and less costly than possible in the current art.

II. Consumer Sentiment Analysis

Figure 8:
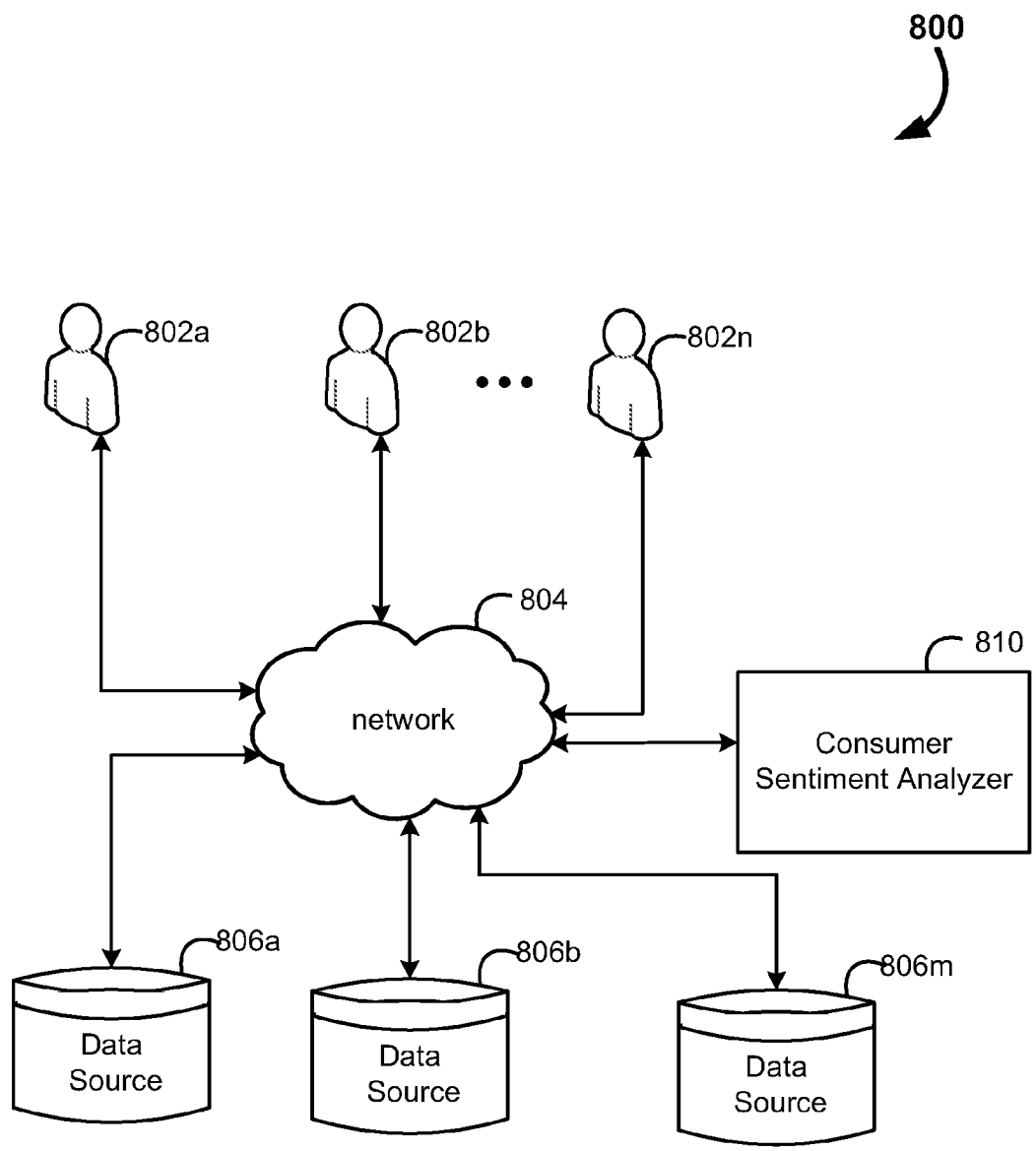
FIG. 8 illustrates a block diagram of an example environment where a cloud based consumer sentiment system operate, in accordance with some embodiments.

Now that underlying technology for an abstractly-implemented data analysis system has been described in considerable detail, attention shall now be shifted to the generation and analysis of consumer sentiment. To facilitate the discussion, FIG. 8 provides an example schematic block diagram for an example environment 800 where consumer sentiment may be determined and analyzed. In this example environment, a plurality of consumer 802*a-n* are seen providing information, via a network 804, that is eventually included within more than one data sources 806*a-m*. The network 804 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The network 804 can be any collection of distinct networks operating wholly or partially in conjunction to provide connectivity between the originators of the data (consumer 802*a-n*), the data sources 806*a-m*, and a consumer sentiment analyzer system 810. In some embodiments, information and communications to and from the consumer 802*a-n*, the data sources 806*a-m*, and the consumer sentiment analyzer system 810 can be achieved by an open network, such as the Internet, or a private network, such as an intranet and/or the extranet. The consumer 802*a-n*, the data sources 806*a-m*, and the consumer sentiment analyzer system 810 can be coupled to the network 804 (e.g., Internet) via a dial-up connection, a digital subscriber loop (DSL, ADSL), cable modem, wireless connections, direct fiber connections and/or any other types of connection.

The data sources 806*a-m* may include corporate transactional systems (such as sales or accounting or customer relations), syndicated data (such as from 3rd party), web-based data (such as social media) and streaming data. The data may be stored in a relational database (RDBM) or in big data-related storage facilities (e.g., Hadoop, NoSQL). With regard to format, the data may be in any format including unstructured, structured, streaming, etc. Data acquisition from the data sources 806*a-m* may employ ETL (Extract, Transform, Load) technologies or may employ custom connectors to the individual data sources 806 for example. The data collection may happen in batches or in real time. As previously discussed, during data collection, business rules may be applied to pre-filter and/or pre-process the data Although not illustrated, in some embodiments there may be additional intermediary objects or entities that are currently omitted for the sake of clarity. For example, a consumer 802 may purchase a product from a merchant, which collects transaction data. The merchant may then provide aggregate transaction data to a retailer consortium, which may ultimately be used to generate a dataset of product sales trends. Such data may be very useful to the consumer sentiment analyzer system 810, and may be a data store 806 utilized for the sentiment analysis. The merchant and consortium, in this example scenario are purposefully omitted in order to not overly clutter the figure. However, it should be noted that this does not therefore limit the data stores 806*a-m* to receiving data directly from the consumers 802*a-n*, nor does it require the network 804 as an intermediate.

The consumer sentiment analyzer system 810 is able to query the various data stores 806*a-m* in order to generate consumer sentiment insights. These insights, in some embodiments, may be aggregated by various consumer segments, and may further take into account social media insights and impacts. In some embodiments, the consumer sentiment analyzer system 810 includes many structural components, including load balancing servers, data analytics servers working in parallel to sort, integrate, extract, model and eventually visualize the data from the data stores. Local databases within the consumer sentiment analyzer system 810 are used to store transient data signals, and longer lived results from the analysis of data stores. Local databases may likewise be utilized to cache information from the data stores 806*a-m* in order to enhance performance, and ensure operability if the data store 806 becomes disrupted.

Figure 9:
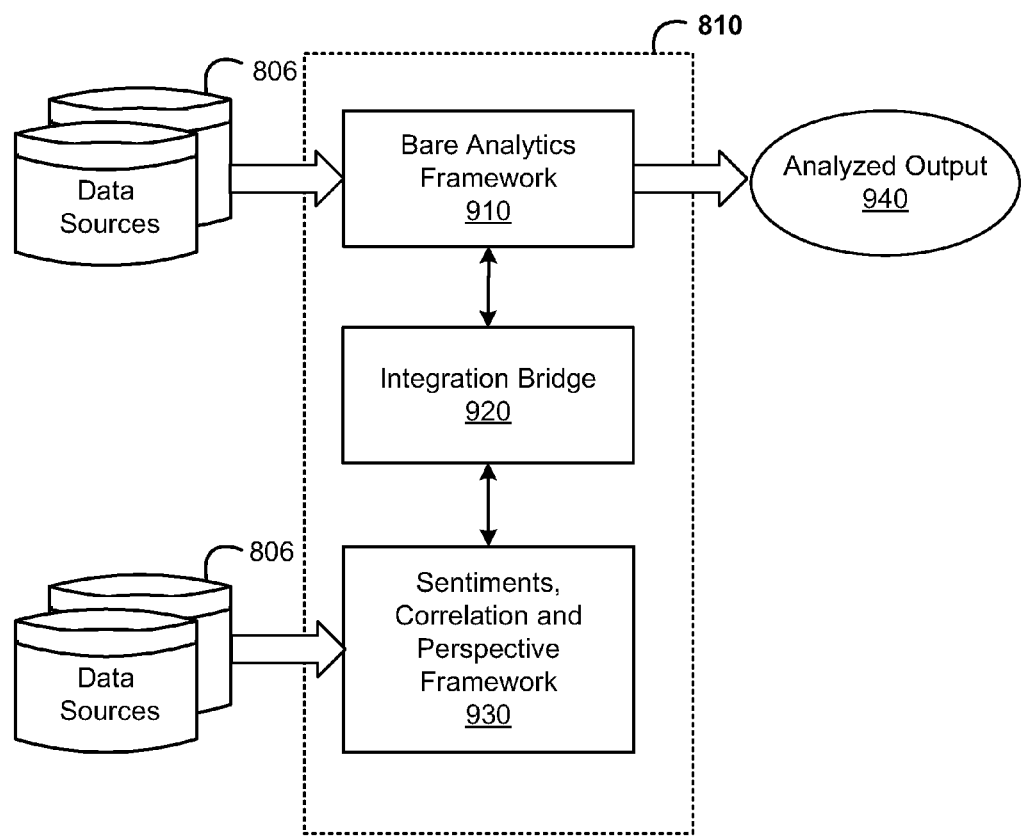
FIG. 9 illustrates a block diagram of an more detailed example of the consumer sentiment system, in accordance with some embodiments.

FIG. 9 provides more details into one embodiment of the consumer sentiment analyzer system 810 at issue in this disclosure. In this example system, different or partially different data sources 806 are utilized by two subcomponents of the consumer sentiment analyzer system 810. The first subcomponent is a bare analytics framework 910, which is coupled to a sentiments, correlation and perspective framework 930 via an integration bridge 920. The bare analytics framework 910 may be capable to compiling the complete analysis to generate the output 940 for storage and viewing by downstream users or business applications.

In this embodiment, the bare analytics framework 910 has the capability to house any structured and unstructured data for analytics on the cloud environment. The sentiments, correlation and perspective framework 930 includes advanced algorithms to analyze data collected from social, syndicated and unstructured data. The analysis is based on the key parameters that are requested by the user or business. In some embodiments, the parameters may be configured via the interface described above, or may be requested as part of the system build.

The integration bridge 920 joins the two subsystems. The integration bridge 920 is capable of receiving a name value pair from the bare analytics framework 910 and passes it to the sentiments, correlation and perspective framework 930 for modeling and analysis. In turn, the integration bridge 920 is capable of passing the resulting correlated prescriptive information back from the correlation and perspective framework 930 to the bare analytics framework 910. In some embodiments, the sentiments, correlation and perspective framework 930 may be an open architecture configured to switch models and algorithms used for the analysis of incoming data based upon need.

Figure 10:
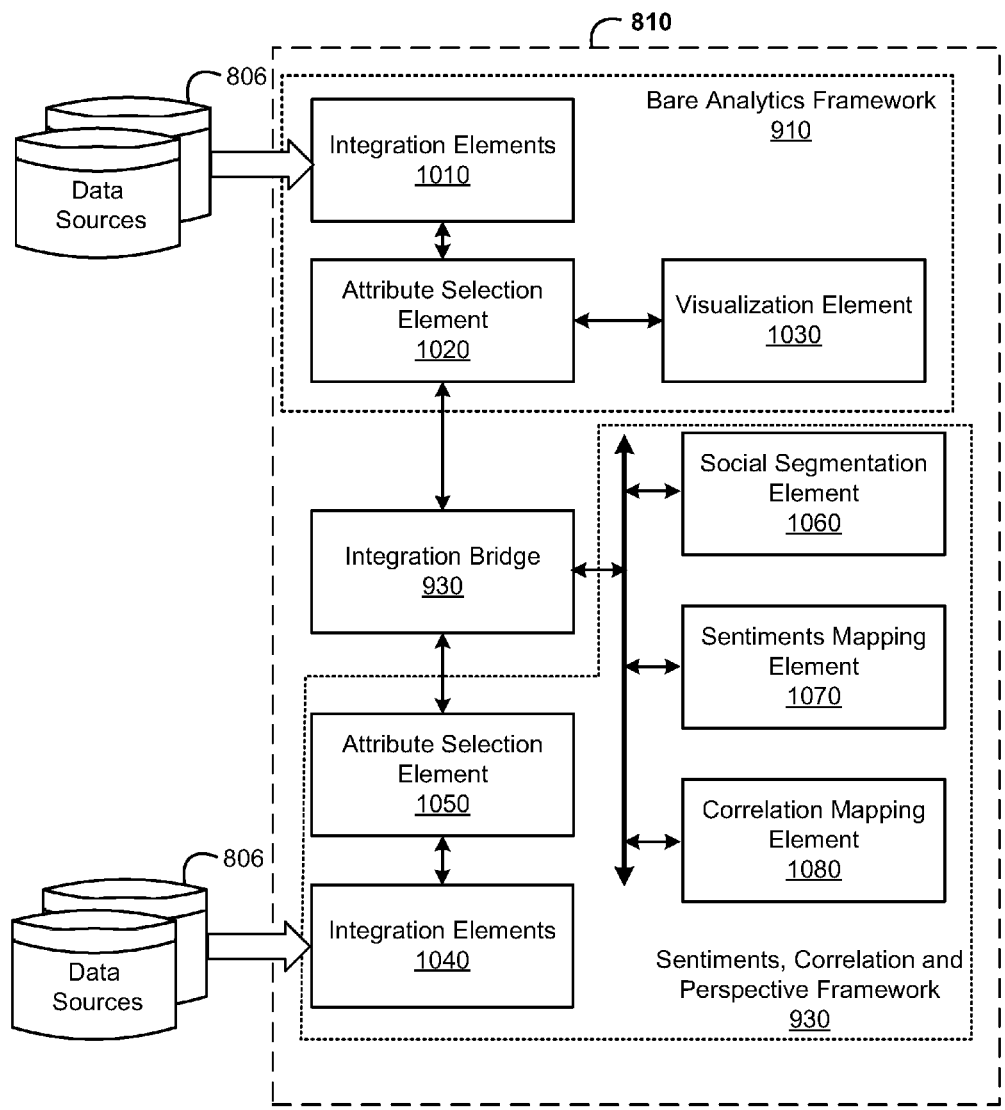
FIG. 10 illustrates a logical diagram of the connectivity of the various subcomponents of the consumer sentiment system, in accordance with some embodiments.

Turning toward FIG. 10, a more detailed example of the logical connectivity of the various components of the consumer sentiment analyzer system 810 is provided. Again, it can be seen that data sources 806 provide information to both the correlation and perspective framework 930 and the bare analytics framework 910, respectively. The data sources 806 provide input to integration elements 1040 and 1010, respectively, which generates a data signal from the source data. Source data may be structured or unstructured, so the integration elements 1040 and 1010 transform the source data into standardized formats, and perform preconditioning of the data. Subsequently, attribution selection elements 1050 and 1020, respectively, select out the data that is relevant for sentiment analysis. This selected data may be provided to the integration bridge 930 in the form of name value pair requests, which may then be provided to at least one of the social segmentation element 1060, the sentiments mapping element 1070, and the correlation mapping element 1080. These elements may leverage advanced models in order to perform their analysis.

The social segmentation element 1060 may be used to aggregate users based upon similar features into discrete segments based upon social network data. Examples of segment dimensions include demographics, familial status, education level, political views, age, similar interests, affiliations, wealth and/or income levels, or the like. The sentiments mapping element 1070 may be able to determine the sentiment a consumer or group of consumers has, at any given time period, regarding any target. For a business, the target is most often a product, brand, advertisement campaign, or business practice. However, in some embodiments, the user of the system may be able to configure any target, and audience, for sentiment analysis. For example, in relation to a political campaign, a campaign manager may wish to examine the sentiment for a candidate policy (target) among a social segment including members of the candidate's party between the ages of 30-55, with a median income above $50,000 (audience).

Lastly, the correlation mapping element 1080 may be utilized in conjunction with sentiment analysis, or as an independent analysis feature, in order to correlate attributes of a given business or function. This correlation may utilize clustering algorithms, multi-objective optimizations, and/or distance functions to correlate attributes. The correlation mapping element 1080 may identify correlations across the various data sources, which are often very diverse and independent from one another. Initially the system calculates polarity, emotions and topicality (collectively referred to as PET) for a given query. This PET value is used to identify correlations across structured, unstructured and syndicated data, in some particular embodiments.

Structurally, the social segmentation element 1060, the sentiments mapping element 1070, and the correlation mapping element 1080 reside as part of the correlation and perspective framework 930, in some embodiments. However, from a logical perspective, these subcomponents may be viewed as interacting directly with the integration bridge 920. Resulting analysis from each of the social segmentation element 1060, the sentiments mapping element 1070, and the correlation mapping element 1080 is thus returned via the integration bridge 920, and may eventually be presented to a user via a visualization element 1030. The visualization element 1030 may reside as part of the bare analytics framework 910.

Figure 11:
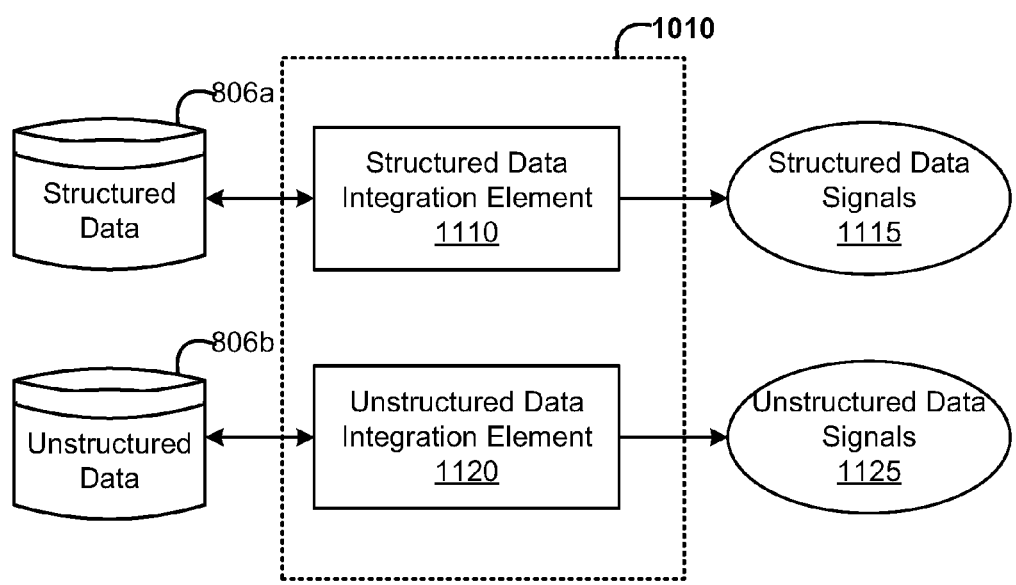
FIG. 11 illustrates a logical diagram of the integration elements of the bare analytics framework, in accordance with some embodiments.

Turning to FIG. 11, a more detailed view is provided of the integration element 1010 found within the bare analytics framework 910. The data sources leveraged by the integration element 1010 include structured data 806*a* and unstructured data 806*b*. These data sources are integrated by a structured data integration element 1110 and an unstructured data integration element 1120, respectively. The result of said integration is a structured data signal 1115 and an unstructured data signal 1125, respectively.

Figure 12:
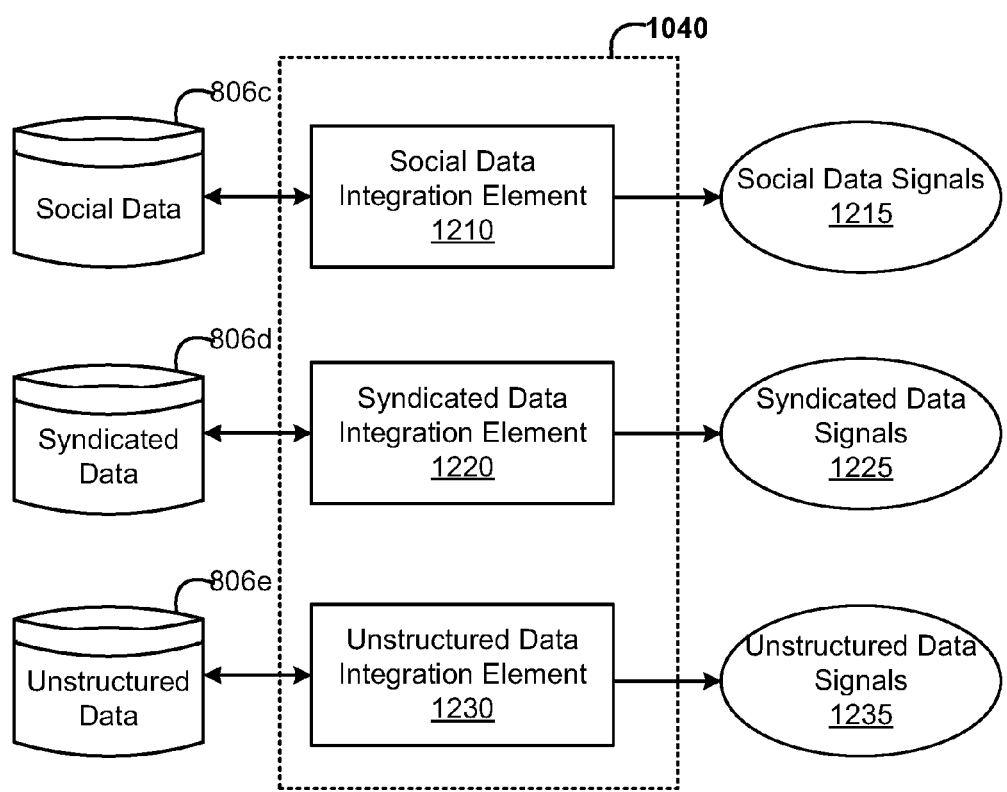
FIG. 12 illustrates a logical diagram of the integration elements of the sentiments, correlation and perspectives framework, in accordance with some embodiments.

Similarly, FIG. 12 provides a more detailed view of the integration element 1040 found within the correlation and perspective framework 930. The data sources leveraged by the integration element 1040 include social data 806*c*, syndicated data 806*d* and unstructured data 806*e*. These data sources are integrated by a social data integration element 1210, a syndicated data integration element 1220, and an unstructured data integration element 1230, respectively. The result of said integration is a social data signal 1215, a syndicated data signal 1225, and an unstructured data signal 1235, respectively.

Figure 13:
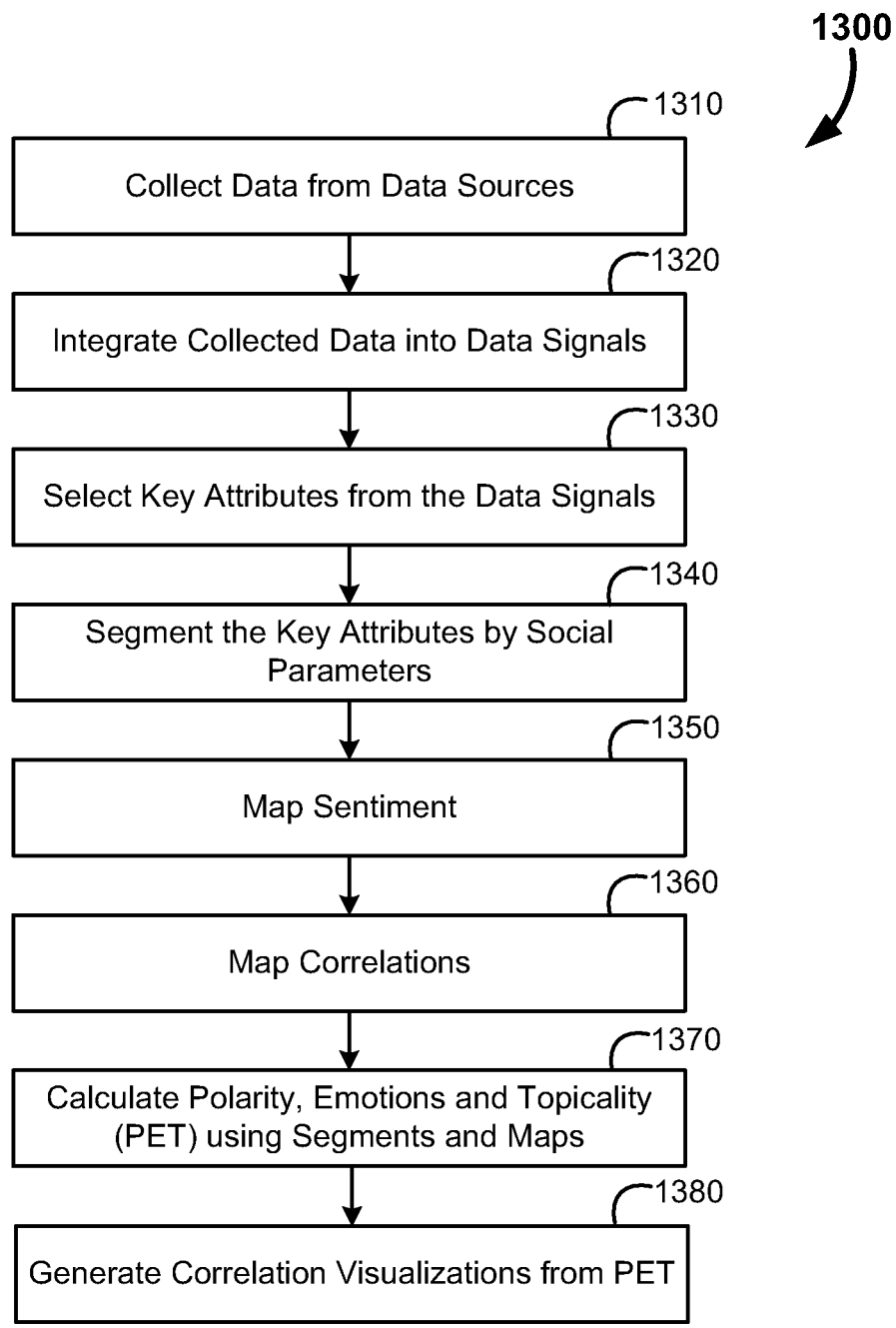
FIG. 13 is a flow diagram illustrating an example process for the generation and analysis of cloud based consumer sentiment with social insights, in accordance with some embodiments.

Now, turning to FIG. 13, an example process 1300 is provided for the generation of a correlation visualization using diverse data sources within such a business analytics system. As discussed, the data is initially collected from the various data sources, at 1310. The data includes structured data, unstructured data, social data, and syndicated data. The collected data may be parsed according to business rules, in order to remove redundant, erroneous, or irrelevant data. This data may be integrated into various data signals, at 1320, which are provided to an attribute selector. The data signals include structured data signals, unstructured data signals, social data signals, and syndicated data signals.

The selector may identify key attributes within the data signals, and provide these attributes as name value pairs to various analysis elements, at 1330. The first analysis utilizes the social data signal to segment the data by a desired parameter, at 1340. In some embodiments, the next analysis step is to determine sentiment, utilizing mapping and modeling techniques, for a target and a given audience, at 1350. In some cases the audience is a segment identified previously. In alternate embodiments, the sentiment analysis may be skipped for a reduction in processing requirements, or if the data is insufficient to generate accurate sentiment data.

Additionally, the correlations between attributes across the diverse data signals may be correlated, at 1360, by a correlation mapping element. Models may be leveraged to calculate the polarity, emotions and topicality (PET) using the segments and maps, at 1370, in some embodiments. The correlation visualizations are then generated from the resulting PET, at 1380. These visualizations may be leveraged by businesses or other users in order to formulate business strategies, or as factors in business decision making.

III. System Embodiments

Figure 14A:
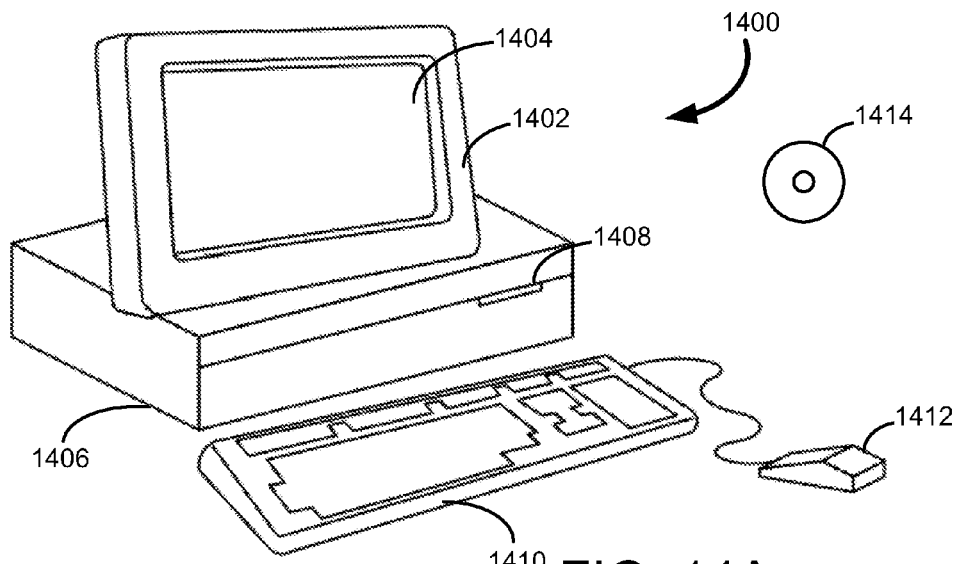
FIGS. 14A and 14B are example computer systems capable of implementing the system for consumer sentiment analysis, in accordance with some embodiments.
Figure 14B:
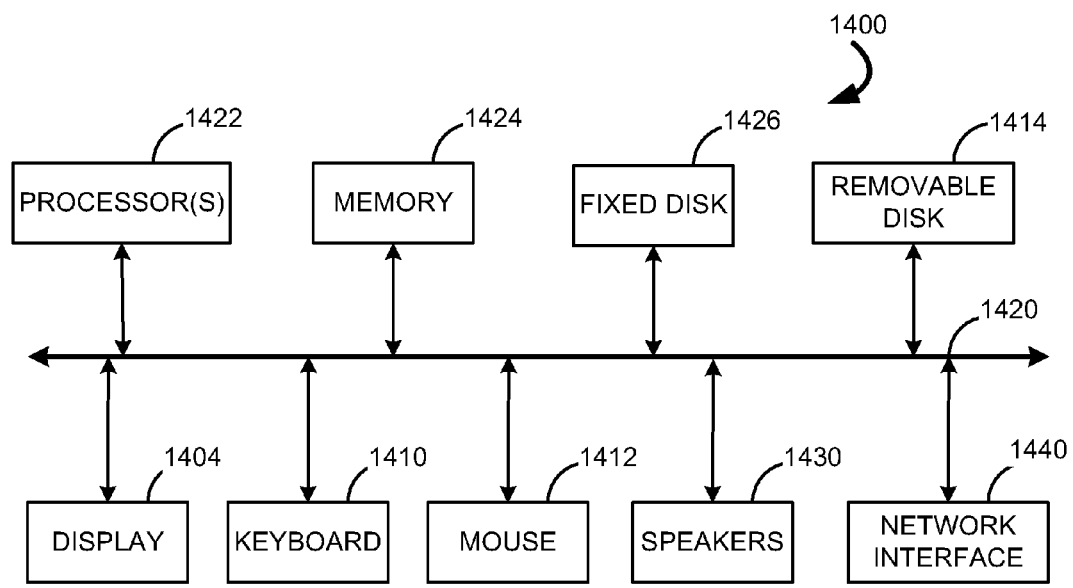

Now that the systems and methods for the sentiment analysis by consumer segment for the generation of correlation visualizations has been described in considerable detail, attention shall now be focused upon systems capable of executing the above functions. To facilitate this discussion, FIGS. 14A and 14B illustrate a Computer System 1400, which is suitable for implementing embodiments of the present invention. FIG. 14A shows one possible physical form of the Computer System 1400. Of course, the Computer System 1400 may have many physical forms ranging from a printed circuit board, an integrated circuit, and a small handheld device up to a huge super computer. Computer system 1400 may include a Monitor 1402, a Display 1404, a Housing 1406, a Disk Drive 1408, a Keyboard 1410, and a Mouse 1412. Disk 1414 is a computer-readable medium used to transfer data to and from Computer System 1400.

FIG. 14B is an example of a block diagram for Computer System 1400. Attached to System Bus 1420 are a wide variety of subsystems. Processor(s) 1422 (also referred to as central processing units, or CPUs) are coupled to storage devices, including Memory 1424. Memory 1424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1426 may also be coupled bi-directionally to the Processor 1422; it provides additional data storage capacity and may also include any of the computer-readable media described below. Fixed Disk 1426 may be used to store programs, data, and the like and is typically a secondary storage medium (such as a hard disk) that is slower than primary storage. It will be appreciated that the information retained within Fixed Disk 1426 may, in appropriate cases, be incorporated in standard fashion as virtual memory in Memory 1424. Removable Disk 1414 may take the form of any of the computer-readable media described below.

Processor 1422 is also coupled to a variety of input/output devices, such as Display 1404, Keyboard 1410, Mouse 1412 and Speakers 1430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1422 optionally may be coupled to another computer or telecommunications network using Network Interface 1440. With such a Network Interface 1440, it is contemplated that the Processor 1422 might receive information from the network, or might output information to the network in the course of performing the above-described big data analysis for consumer sentiment. Furthermore, method embodiments of the present invention may execute solely upon Processor 1422 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

In sum, the present invention provides systems and methods for generating, analyzing and visualizing consumer sentiments with social insights and by consumer segments. Such systems and methods enable businesses to more efficiently drive business strategies that are responsive to consumer emotions and sentiments in order to increase a business objective.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

What is claimed is:

1. A computer-implemented method for generating consumer sentiment and attribute correlation visualizations from data obtained from a plurality of data sources, comprising:
   integrating data from a plurality of data sources;
   receiving a business intelligence query from a user;
   parsing the business intelligence query to determine polarity, emotion and topicality (PET) of the query;
   selecting key attributes from a plurality of available attributes in the integrated data responsive to the PET;
   compiling the selected key attributes into a metadata construct;
   generating at least one consumer segment using social network data located in the metadata construct;
   generating sentiment for the at least one consumer segment using the metadata construct by load balancing multiple servers operating in parallel coupled to a local database for storing transient analytics data from the plurality of data sources and analysis results thereby enhancing analysis performance, wherein the generation of the sentiment is by name-value pair modeling;
   generating correlations between attributes of the integrated data; and
   generating a visualization of the segment, sentiment and correlations as an infographic and chart;
   outputting the visualization in an electronic format accessible by a third party application.

2. The method of claim 1 wherein the integration employs a cloud-based computing technique.

3. The method of claim 1 wherein the plurality of data sources includes a structured data source, an unstructured data source, a social data source, and a syndicated data source.

4. The method of claim 3 wherein the generating the at least one consumer segment employs the social data source.

5. The method of claim 1 further comprising calculating polarity, emotion and topicality for a target and an audience.

6. The method of claim 5 wherein the audience is one of the at least one consumer segment.

7. The method of claim 5 wherein the correlation visualization utilizes the calculated polarity, emotion and topicality.

8. The method of claim 1 wherein the correlation is generated using clustering algorithms.

9. The method of claim 1 wherein the selected key attributes are name value pair requests.

10. The method of claim 1 wherein the generating sentiment and generating correlations dynamically utilizes models according to attributes of the integrated data.

11. The method of claim 1 wherein the attributes are correlated using at least one of clustering algorithms, multi-objective optimizations, and distance functions.

12. A system for generating consumer sentiment and attribute correlation visualizations from data obtained from a plurality of data sources, comprising:

at least two integration elements configured to integrate data from a plurality of data sources;

an interface for receiving a business intelligence query from a user;

a parser for parsing the business intelligence query to determine polarity, emotion and topicality (PET) of the query;

at least two attribute selectors configured to select key attributes from a plurality of available attributes in the integrated data responsive to the PET, and compile the selected key attributes into a metadata construct;

a social segment element configured to generate at least one consumer segment using social network data located in the metadata construct;

a sentiments mapping element configured to generate sentiment for the at least one consumer segment using the metadata construct, wherein the sentiments mapping element consists of multiple load balancing servers operating in parallel coupled to a local database for storing transient analytics data from the plurality of data sources and analysis results thereby enhancing analysis performance, wherein the generation of the sentiment is by name-value pair modeling;

a correlation mapping element configured to generate correlations between attributes of the integrated data; and a visualization element configured to generate a visualization of the segment, sentiment and correlations, integrating data from a plurality of data sources as an infographic and chart, and outputting the visualization in an electronic format accessible by a third party application.

13. The system of claim 12 wherein the at least two integration elements employ cloud-based computing technique.

14. The system of claim 12 wherein the plurality of data sources includes a structured data source, an unstructured data source, a social data source, and a syndicated data source.

15. The system of claim 14 wherein the social segment element generates the at least one consumer segment employs the social data source.

16. The system of claim 12 wherein the sentiments mapping element is further configured to calculate polarity, emotion and topicality for a target and an audience.

17. The system of claim 16 wherein the audience is one of the at least one consumer segment.

18. The system of claim 16 wherein the visualization element utilizes the calculated polarity, emotion and topicality to generate the visualization.

19. The system of claim 12 wherein the correlation mapping element generates the correlation using clustering algorithms.

20. The system of claim 12 wherein the selected key attributes are name value pair requests.

21. The system of claim 12 wherein the sentiment mapping element and the correlation mapping element dynamically utilize models according to attributes of the integrated data.

22. The system of claim 12 wherein the attributes are correlated using at least one of clustering algorithms, multi-objective optimizations, and distance functions.

* * * * *